US007639117B2

(12) United States Patent
Wiemeyer

(10) Patent No.: US 7,639,117 B2
(45) Date of Patent: Dec. 29, 2009

(54) ACCESS CONTROL SYSTEM WITH ENERGY-SAVING OPTICAL TOKEN PRESENCE SENSOR SYSTEM

(75) Inventor: James F. Wiemeyer, Homer Township, IL (US)

(73) Assignee: Harrow Products LLC, Montvale, NJ (US)

( * ) Notice: Subject to any disclaimer, the term of this patent is extended or adjusted under 35 U.S.C. 154(b) by 368 days.

(21) Appl. No.: 11/038,967

(22) Filed: Jan. 20, 2005

(65) Prior Publication Data

US 2005/0195067 A1 Sep. 8, 2005

Related U.S. Application Data

(60) Provisional application No. 60/537,850, filed on Jan. 20, 2004.

(51) Int. Cl.
*G06F 7/04* (2006.01)

(52) U.S. Cl. .................... 340/5.61; 340/10.5; 340/10.4; 340/3.1; 235/439; 235/380

(58) Field of Classification Search ................ 340/5.28, 340/5.1, 5.2, 5.6, 5.64, 6.61, 5.61, 10.5, 10.4, 340/3.1; 235/439, 380, 379, 435
See application file for complete search history.

(56) References Cited

U.S. PATENT DOCUMENTS 3,681,703 A * 8/1972 Johnson ......................... 330/9
3,873,911 A * 3/1975 Champlin ................... 324/430
3,964,041 A * 6/1976 Hinds ............................ 377/6
4,675,516 A * 6/1987 Guion ........................ 235/441
4,771,396 A * 9/1988 South et al. ................. 708/319
5,239,692 A 8/1993 Kim
5,321,963 A 6/1994 Goldman
5,491,471 A * 2/1996 Stobbe ...................... 340/5.61
5,625,338 A 4/1997 Pildner et al.
5,677,682 A 10/1997 Thorsen et al.
5,682,135 A 10/1997 Labonde et al.
5,712,973 A 1/1998 Dayan et al.
5,767,791 A 6/1998 Stoop et al.
5,774,059 A 6/1998 Henry et al.
5,805,063 A 9/1998 Kackman
5,808,296 A 9/1998 McMonagle et al.
5,809,013 A 9/1998 Kackman (Continued)

FOREIGN PATENT DOCUMENTS

FR 2749607 12/1997

(Continued)

*Primary Examiner*—Vernal U Brown
(74) *Attorney, Agent, or Firm*—Michael Best & Friedrich LLP

(57) ABSTRACT

An access control system having an energy-saving optical presence sensor system is provided. The access control system includes a relatively lower operating power object presence sensor system for optically sensing the presence of a token as well in addition to a relatively higher operating power token reader for reading the token. The token reader remains unpowered until a token is detected by the object presence sensor system, which is preferably always powered. Once an object is detected by the object presence sensor system, power is supplied to the token reader and the token is read. After the token has been read, power ceases to be applied to the token reader, although the object presence sensor remains powered.

23 Claims, 3 Drawing Sheets

U.S. PATENT DOCUMENTS

| | | | |
|---|---|---|---|
| 5,823,028 | A | 10/1998 | Mizuno et al. |
| 5,907,279 | A | 5/1999 | Bruins et al. |
| 5,936,544 | A | 8/1999 | Gonzales et al. |
| 5,936,960 | A | 8/1999 | Stewart |
| 5,942,985 | A | 8/1999 | Chin |
| 5,950,110 | A | 9/1999 | Hendrickson |
| 5,970,227 | A | 10/1999 | Dayan et al. |
| 6,005,306 | A | 12/1999 | Pickard |
| 6,072,402 | A | 6/2000 | Kniffin et al. |
| 6,177,861 | B1 | 1/2001 | MacLellan et al. |
| 6,309,098 | B1 * | 10/2001 | Wong .......................... 368/94 |
| 6,344,797 | B1 | 2/2002 | Hosny |
| 6,359,547 | B1 | 3/2002 | Denison et al. |
| 6,420,961 | B1 | 7/2002 | Bates et al. |
| 6,570,498 | B1 | 5/2003 | Frost et al. |
| 6,668,606 | B1 | 12/2003 | Russell et al. |
| 6,720,861 | B1 | 4/2004 | Rodenbeck et al. |
| 7,100,829 | B2 * | 9/2006 | Okada ........................ 235/439 |
| 2003/0025082 | A1 | 2/2003 | Brewington et al. |
| 2003/0074936 | A1 | 4/2003 | Conforti |
| 2003/0096607 | A1 | 5/2003 | Taylor |
| 2003/0098777 | A1 | 5/2003 | Taylor et al. |
| 2003/0098778 | A1 | 5/2003 | Taylor et al. |
| 2003/0098779 | A1 | 5/2003 | Taylor et al. |
| 2003/0098780 | A1 | 5/2003 | Taylor et al. |
| 2003/0100266 | A1 | 5/2003 | Wiemeyer et al. |
| 2003/0103472 | A1 | 6/2003 | Taylor et al. |
| 2003/0117263 | A1 | 6/2003 | Gonzales et al. |
| 2003/0143956 | A1 | 7/2003 | Taylor |

FOREIGN PATENT DOCUMENTS

| | | | |
|---|---|---|---|
| FR | 2749607 | A | 12/1997 |
| WO | 02/25040 | A1 | 3/2002 |
| WO | WO 02/25040 | | 3/2002 |
| WO | 0232045 | A1 | 4/2002 |

* cited by examiner

ACCESS CONTROL SYSTEM WITH ENERGY-SAVING OPTICAL TOKEN PRESENCE SENSOR SYSTEM

RELATED APPLICATIONS

The present application claims priority to the following applications: application Ser. No. 10/261,933, entitled "RF Channel Linking Method and System" filed Sep. 30, 2002; application Ser. No. 10/262,207, entitled "Energy Saving Motor-Driven Locking Subsystem" filed Sep. 30, 2002; application Ser. No. 10/262,509, entitled "Cardholder Interface for an Access Control System" filed Sep. 30, 2002; application Ser. No. 10/262,196, entitled "System Management Interface for Radio Frequency Access Control" filed Sep. 30, 2002; application Ser. No. 10/262,194 entitled "Power Management for Locking System" filed Sep. 30, 2002; application Ser. No. 10/262,507, entitled "General Access Control Features for a RF Access Control System" filed Sep. 30, 2002; application Ser. No. 10/262,077, entitled "RF Wireless Access Control for Locking System" filed Sep. 30, 2002; application Ser. No. 10/262,508, entitled "Maintenance/Trouble Signals for a RF Wireless Locking System" filed Sep. 30, 2002; application Ser. No. 10/262,249, entitled "RF Dynamic Channel Switching Method" filed Sep. 30, 2002, and U.S. Provisional Patent Application No. 60/537,850, entitled "Access Control System With Energy-Saving Optical Token Presence Sensor System" filed Jan. 20, 2004.

BACKGROUND OF THE INVENTION

The preferred embodiments of the present invention relate to an access control system for controlling access to an access point. More specifically, the preferred embodiments of the present invention relate to a method and system for controlling a token reader subsystem of an access control system in such a way as to reduce power consumption of the token reader system.

A wireless access control system may provide several advantages over a traditional, wire-based access control system. In a traditional, wired access control system, each access point, such as a door, for example, is equipped with a locking module to secure the access point. Each locking module is in turn directly wired to a remote access control module. The access control module is typically a database that compares a signal received from the locking module to a stored signal in the database in order to determine an access decision for that locking module. Once the access decision has been determined by the access control module, the decision is relayed to the locking module through the wired connection.

The use of wired connections between the access control module and the locking module necessitates a large investment of time and expense in purchasing and installing the wires. For example, for larger installations, literally miles of wires must be purchased and installed. An access control system that minimizes the time and expense of the installation would be highly desirable.

Additionally, wire-based systems are prone to reliability and security failures. For example, a wire may short out or be cut and the locking module connected to the access control module by the wire may no longer be under the control of the access control module. If a wire connection is cut or goes, the only alternative is to repair the faulty location (which may not be feasible) or run new wire all the way from the access control module to the locking module, thus incurring additional time and expense. Conversely, an access control system that provides several available communication channels between the locking module and the access control module so that if one communication channel is not usable, communication may proceed on one of the other communication channels, would also be highly desirable, especially if such an access control system did not add additional costs to install the additional communication channels.

A wireless access system providing a wireless communication channel between the locking module and the access control module may provide many benefits over the standard, wire-based access control system. Such a wireless access system is typically less expensive to install and maintain due to the minimization of wire and the necessary installation time. Additionally, such a system is typically more secure because communication between the locking module and the access control module is more robust that a single wire.

However, one difficulty often encountered in installing and maintaining such a wireless access system is providing power to the individual, remote locking modules. For example, many functions of the locking module may be quite demanding of power. However, maintenance costs associated with frequently changing the power sources for each of the locking modules would be highly undesirable.

Consequently, an access control system have increased power efficiency would be highly desirable. Such an access control system would prolong the active life of the power source, such as a battery, and would thus be highly desirable in terms of minimizing costs associated with the replacement of the power sources, such as the cost of the power sources themselves and the costs for labor to replace the power sources.

BRIEF SUMMARY OF THE INVENTION

A preferred embodiment of the present invention applies to security and identification systems, especially such systems that are responsive to the presentation of a token such as an access card or a biometric. A preferred embodiment of the present invention may be particularly useful when deployed used in conjunction with battery operated token readers. A preferred embodiment of the present invention maximizes battery life through minimizing the energy required to operate a given token reader, on demand, with minimum elapsed time. That is, a initial low-power consumption system may be continually sensing to determine whether a token has been presented. When the initial low-power consumption system detects the presence of a token, an enabling signal is sent to activate the relatively higher-power consumption token reader. Once the token has been read, the token reader is deactivated until the next time a token is detected by the initial low-power consumption system. In a typical access system, a token is presented infrequently. Consequently, significant power saving may be obtained by deactivating the higher-power consumption token reader except when necessary to read a token.

DETAILED DESCRIPTION OF THE INVENTION

Figure 1:
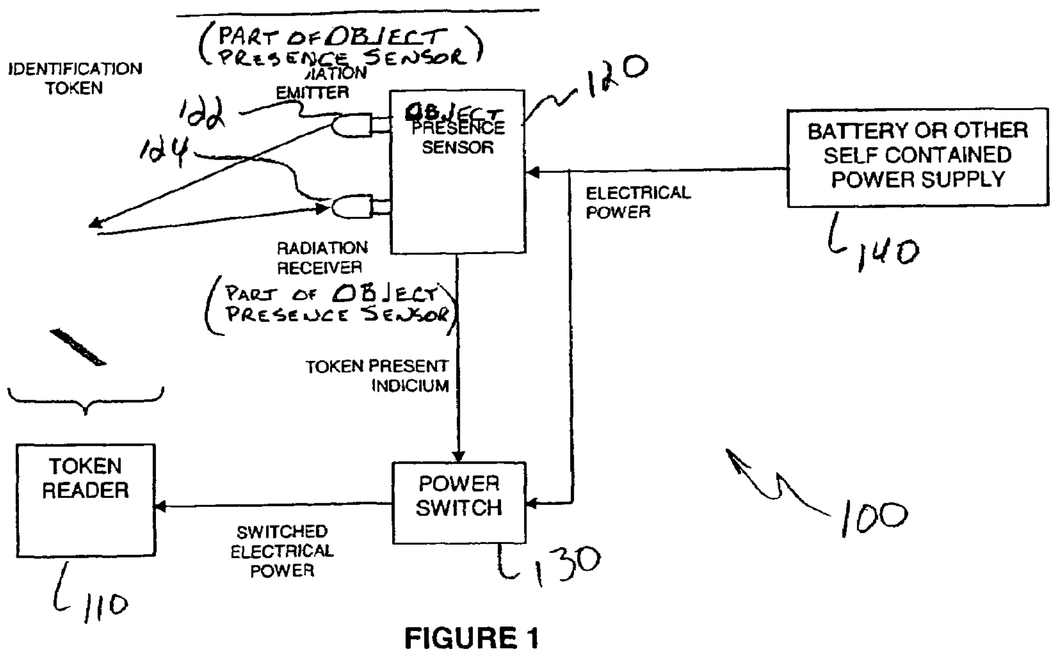
FIG. 1 illustrates one embodiment of the energy saving optical token presence sensor system.

The present application may be employed in a wireless access system. Additional disclosure of such a wireless access system may be found in the following applications which are hereby incorporated by reference in their entirety: application Ser. No. 10/261,933, entitled "RF Channel Linking Method and System" filed Sep. 30, 2002; application Ser. No. 10/262,207, entitled "Energy Saving Motor-Driven Locking Subsystem" filed Sep. 30, 2002; application Ser. No. 10/262,509, entitled "Cardholder Interface for an Access Control System" filed Sep. 30, 2002; application Ser. No. 10/262,196, entitled "System Management Interface for Radio Frequency Access Control" filed Sep. 30, 2002; application Ser. No. 10/262,194, entitled "Power Management for Locking System" filed Sep. 30, 2002; application Ser. No. 10/262,507, entitled "General Access Control Features for a RF Access Control System" filed Sep. 30, 2002; application Ser. No. 10/262,077, entitled "RF Wireless Access Control for Locking System" filed Sep. 30, 2002; application Ser. No. 10/262,508, entitled "Maintenance/Trouble Signals for a RF Wireless Locking System" filed Sep. 30, 2002; and application Ser. No. 10/262,249, entitled "RF Dynamic Channel Switching Method" filed Sep. 30, 2002.

A preferred embodiment of the present invention applies to security and identification systems. These may represent applications where secure systems require presentation of identification tokens to obtain access to a locked space, protected space, or financial account, for example. A preferred embodiment of the present invention also applies to inventory systems where identification tokens accompany controlled assets. A preferred embodiment of the present invention has particular usefulness when deployed in battery operated token reader because it maximizes battery life through minimizing the energy required to operate a given token reader, on demand, with minimum elapsed time. Finally, a preferred embodiment of the present invention also applies to physical proximity sensors that detect when objects occupy space within the sensor's field of view.

Typical identification token readers, such as proximity card readers, require a relatively large amount of power to operate. Their power consumption would drain a typical battery power supply within several days or weeks. A preferred embodiment of the present invention illustrates a method and system of implementing a low average power consumption identification token reader, even though the reader transducer itself may require relatively large amounts of operating power when required to read a token.

The general methodology involves detection of an object's presence and using the indicium to energize the token reader immediately upon demand, in other words immediately at the onset of presentation of the token. The method and apparatus differs from prior disclosed methods that require withdrawal of the token before generation of the token present indicium. The disclosed method has several advantages including fast response time, greatly improved ambient light rejection, very low current and power consumption, hysteresis in sensing range, and low cost using commonly available electronic semiconductors.

FIG. 1 illustrates one embodiment of the energy saving optical token presence sensor system 100. The optical token presence sensor system 100 includes a token reader 110, an object presence sensor 120, a power switch 130, and a battery of other self-contained power supply 140.

The token reader 110 resides preferably in the same housing with an object presence sensor 120 and power switch 130. The object presence sensor 120 includes a radiation emitter 122, a radiation sensor 124, internal signal conditioning, and control circuitry. In a preferred embodiment, a photodiode may serve as the radiation sensor, and an infrared (IR) emitting diode (IRED) may serve as the radiation source. Also in a preferred embodiment, the IRED periodically pulses its emitted light, with a very small duty cycle, to minimize average operating power for the object presence sensor 120.

At the onset of token presentation to the object presence sensor 120, the IR light reflects from the token into the photodiode. A token may consist of an identification card, or any object that carries identifying information. For example, one's own fingerprint may embody a material token. The signal conditioning and control circuitry internal to the object presence sensor detects an increase in the photodiode's electrical signal in response to the reflected light. With a sufficient increase in this signal, the object presence sensor 120 generates a positive token present indication. The range of space adjacent to the object presence sensor for which a positive indicium of highly reflective token presence may be generated is defined as the sensor's field of view.

This positive indicium enables the state of the power switch 130 such that power flows from the battery 140 to the reader 110, energizing the reader. The power switch 130 may optionally include a voltage regulator. Now that the token reader 110 has operating power, it may read data from the token, for example an inductive proximity type identification card. The apparatus preferably energizes the token reader 110 immediately upon demand. After withdrawal of the token, no reflected light reaches the photodiode, and the token present sensor indicates "no token present", the negative token present indicium. The power switch 130 changes state to block the flow of battery power to the reader. Now only the object presence sensor 120 draws operating power from the battery 140 (or other self contained power supply). If the object presence sensor 120 design achieves sufficiently low power consumption, the apparatus may attain very long battery life.

Figure 2:
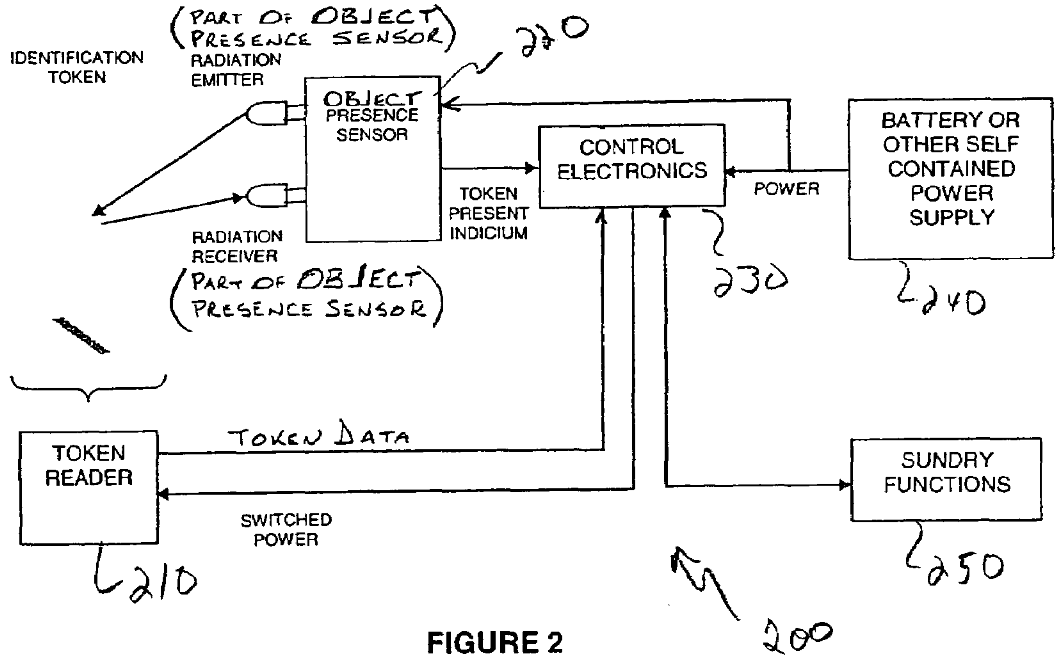
FIG. 2 illustrates a second embodiment of the energy saving optical token presence sensor system.

FIG. 2 illustrates a second embodiment of the energy saving optical token presence sensor system 200. The optical token presence sensor system 200 includes a token reader 210, an object presence sensor 220, control electronics 230, a battery of other self-contained power supply 240, and other sundry functions 250.

The system of FIG. 2 operated generally similar to that of FIG. 1, but includes control electronics sub-circuit 230 and sundry functions 250 in addition to the elements shown in FIG. 1. The object presence sensor 220 generates its indicium in the same way, but supplies the information to the control electronics sub-circuit 230.

A preferred embodiment of the control electronics sub-circuit 230 includes a programmable microcontroller or microprocessor. Other forms of control electronics logic may also be used. Examples include discrete logic or programmable logic arrays well known to those skilled in the art. When a positive token present indicium signals a token present, the control electronics microprocessor then changes state from low power sleep mode to active mode. The microprocessor enables the supply of battery operating power to the token reader 210 and receives the read token data. The microprocessor then removes operating power from the reader 210.

At any time during its wake-up state, the control electronics sub-circuit 230 may execute any number of sundry functions 250, for example, including telemetry of RF communications to a remote authorization unit, driving motors or relays to lock or unlock access portals, activating or extinguishing audible and visible indicators, initiating other types of communications, and the like. After the transaction has completed, the control electronics 230 returns to its low current sleep mode, minimizing power consumption and maximizing battery life.

Use of a logical control unit such as a microprocessor in this embodiment has reliability advantages. If a non-token object such as precipitation reflects light into the object presence sensor for longer than a predetermined time, the control electronics 230 may remove operating power from the reader 210. The control electronics 230 may discern these false indications of token present by the nonexistence of token data from the reader 210 within the predetermined elapsed time after initiation of power to the reader. An example of a predetermined elapsed time is 0.5 seconds. In this way the control electronics prevents inadvertent battery depletion using a relatively simple logic. Removal of the non-token material from the view of the sensor quite naturally preferably restores the reader to its full functionality.

Figure 3:
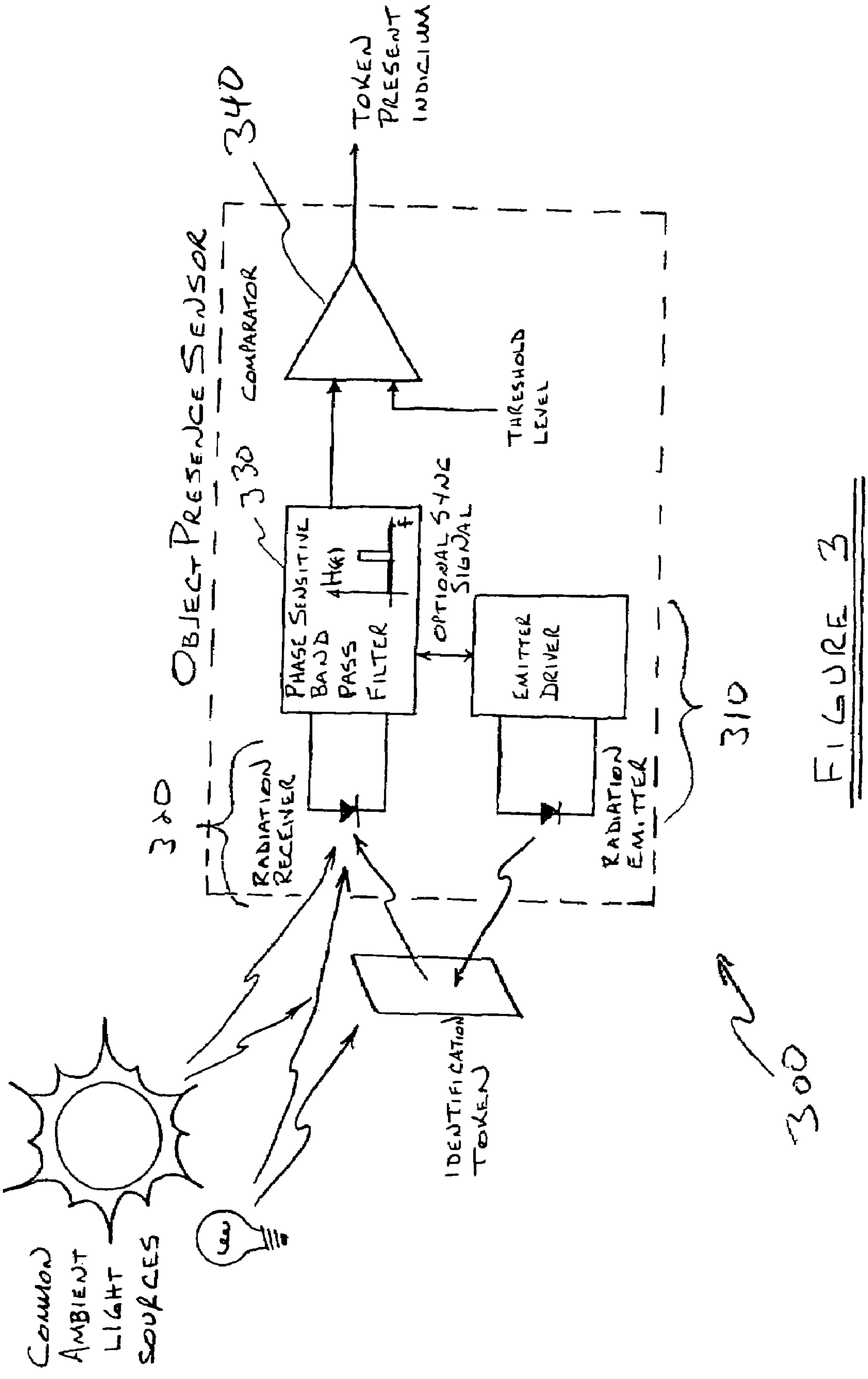
FIG. 3 illustrates a preferred embodiment of the object presence sensor previously depicted in FIGS. 1 and 2.

FIG. 3 illustrates a preferred embodiment of the object presence sensor 300 previously depicted in FIGS. 1 and 2. The object presence sensor 300 includes a radiation emitter 310, a radiation receiver 320, a band-pass filter 330, and a comparator 340.

In a preferred embodiment, a photodiode may serve as the radiation sensor 320, and an IRED may serve as the radiation source 310. Also in a preferred embodiment, the IRED periodically pulses its emitted light, with a very small duty cycle, to minimize average operating power for the token present sensor.

FIG. 3 shows several sources of light incident upon the photodiode, including IRED reflections from a token, 120 Hz man made light, and nearly 0 Hz sunlight. The photodiode's electrical response to incident light flows into a band pass filter 330. By selecting a frequency pass band that excludes 0 Hz and 120 Hz, the sensor may achieve high sensitivity even in the presence of the shown interfering light sources. Rejection of these confounding interferences prevents battery depletion due to wasteful frequent false indications of object presence. Additionally, the band-pass filter may be programmable to exclude any other type of undesired external optical signal.

In a preferred embodiment of the object presence sensor 300, at least one synchronization (sync) signal coordinates the timing of the IRED driver and phase sensitive band-pass filter. Although shown as a single bus, the sync signal may take the form of a plurality of individual signals, coordinated to control the timing of events such as powering amplifiers, amplifier offset zeroing, IRED drive timing, and the like.

One well known characteristic of certain active phase sensitive filters translates the output to center on 0 Hz. In this case a simple comparator 340 measures the filtered photodiode response against a DC threshold level, and yields the token present indicium. If the filtered photodiode response exceeds the threshold level, then the comparator 340 yields a positive token present indicium. If the filtered photodiode response falls under the threshold level, then the comparator 340 yields a negative token present indicium.

It is well understood that either polarity for the comparator logic may be implemented, without material difference from the disclosed methodology. A known desirable property of comparator design includes hysteresis, a positive feedback polarity shift in the effective switching threshold of the comparator circuit. This property actually causes the token present indicium to behave in a more stable way, eliminating noise during the switching of states between present and not present, and vice versa. When an object presents itself to the object presence sensor and activates the indicium to the positive token present state, then the object must typically increase in distance from the sensor in order to reverse the indicium's state back to negative token present. This results in a clearly discernible, stable indicium for use by the sub-circuits described in these disclosures.

That is, instead of a single on-off threshold for detection of the token, two thresholds may be implemented. A first threshold at a higher received signal level and a second threshold at a lower received signal level. Before a token is presented, the sensor is in an "off" state. As a token is presented, the net received signal level begins to rise from zero. As the received signal level passes the second threshold, no action occurs. However, once the received signal level reaches the higher signal level of the first threshold, the sensor transitions from an "off" state to an "on" state. As the token is removed, the received signal level begins to lessen. As the received signal level passes the first threshold, no action is taken. However, once the received signal level reaches the lower signal level of the second threshold, the sensor transitions from an "on" state back to an "off" state.

Figure 4:
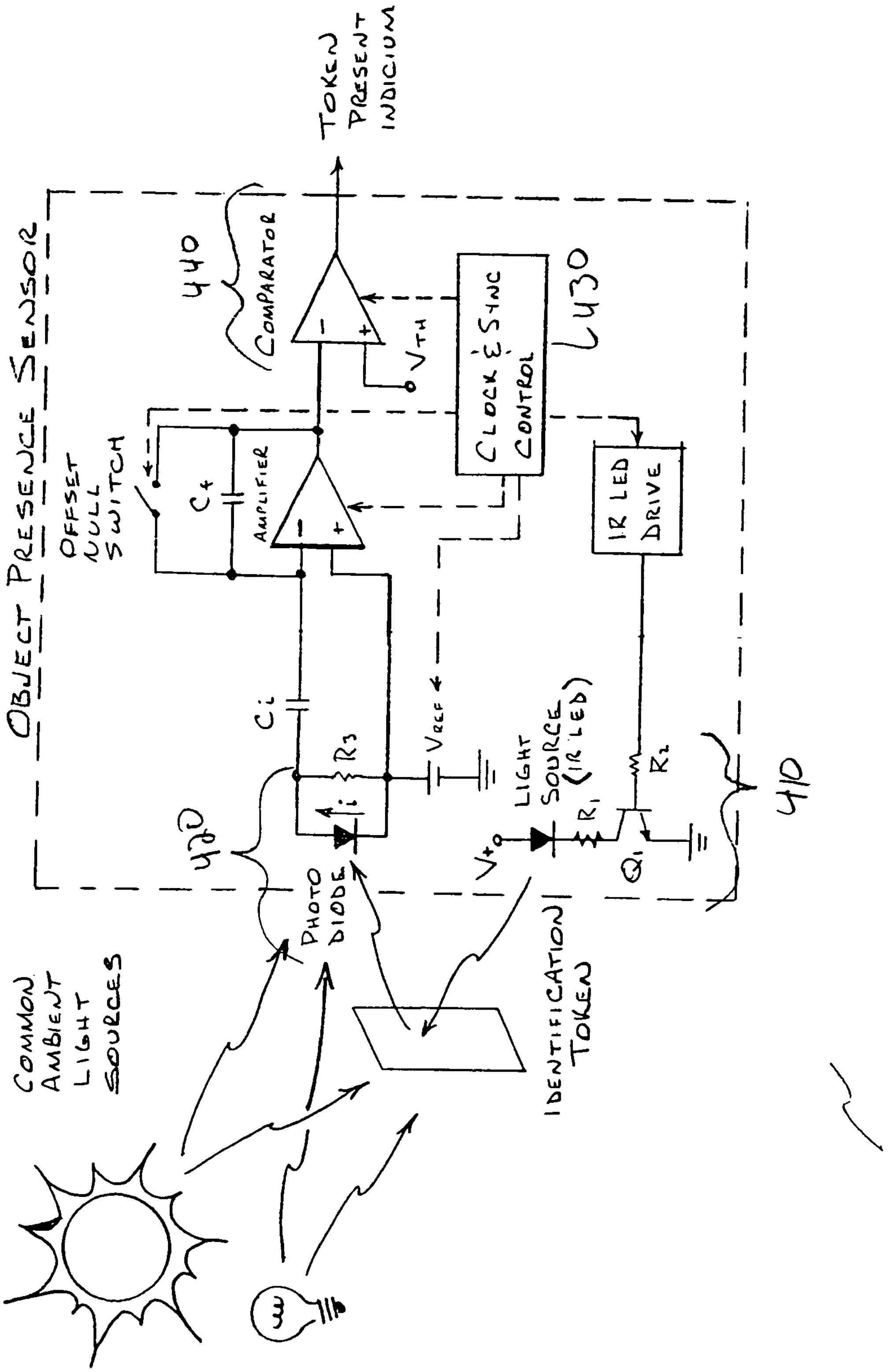
FIG. 4 shows an alternative embodiment of the object presence sensor.

FIG. 4 shows an alternative embodiment of the object presence sensor 400. One skilled in the art may construct an object presence sensor of this type by using of the Motorola MC145012 integrated circuit plus sundry discrete components. FIG. 4 has undergone simplification, compared to the MC145012 data sheet, only as necessary for clarity and relevance. One may also construct an object presence sensor of this type with a logic control unit, such as a programmable microprocessor or microcontroller, plus individual amplifiers, comparators, and so forth.

The object presence sensor 400 again contains the preferred IRED 410 and photodiode 420 as shown in FIG. 4. A laser diode or other radiation source may also embody this element, and other component choices may also embody the receiver. The sensor design again deploys the IRED and photodiode to emit and receive light respectively to and from a token target. If a photodiode is used, an optical band pass filter helps to reduce the effects of ambient interfering light.

The object presence sensor contains a clock and sync control sub-circuit 430 to coordinate the sensor's activities. This block in actuality may be distributed within the sensor. The clock preferably is able to control the timing of the IRED light pulse width, the IRED pulse frequency, the IRED pulse initiation time within the overall chain of events, the power up time of the amplifier, the zeroing of the amplifier offset, the reference voltage for the photodiode bias, and the comparator. With respect to the comparator, for example, multiple positive logic inputs may be required prerequisite to generation of a positive token present indicium. A preferred IREDpulse width of about 100 microseconds or less may be chosen.

R1 may preferably allow approximately 5 milliamperes to flow through an IR LED light source. A different current may be required if a different radiation source is chosen.

The period of IRED pulsation may preferably come to about 150 milliseconds or less, in order to achieve acceptable immediacy of sensor response. If the majority of the average current draw occurs in the IRED drive, then the approximate current consumption comes to: 5 mA×100 microseconds/150 milliseconds=3.3 microamperes average. This makes for a very acceptable number with respect to long battery life. In actuality, the other blocks in the object presence sensor may draw significant amounts of current, such that a total average current draw of 20 to 25 microamperes may be expected. Still, this operating current provides years of battery life if sufficient batteries are chosen, such as multiple AA type alkaline batteries.

Radiation reflected from the identification token into the photodiode generates a current indicated by the arrow, and labeled "i". R3, preferably approximately 47 kilo-ohms, converts the photodiode current into a voltage. The sync control allows for several desirable events to take place:

The sync control turns on the Vref voltage and the amplifier.

The amplifier settles to a stable state before subsequent events.

The sync control closes the offset null switch to zero the amplifier output.

The sync control then opens the switch to allow amplification of subsequent photodiode signals.

The sync control then triggers the IRED pulse.

The amplifier amplifies changes in the photodiode signal.

This synchronized timing scheme reduces the effects of interfering ambient light whose effective periodicity is much greater than 100 microseconds. The desirable effect has similarity to phase sensitive active band pass filtration depicted in FIG. 3.

The amplifier has a capacitive pulse amplification topology whose pulse gain comes to approximately −(Ci/Cf). The design preferably employs Ci>Cf for voltage gain. Other capacitive amplification topologies are possible, including an integrating topology. A low noise integrating topology would result by substituting a short circuit for Ci, yet the same zeroing functionality may be obtained.

The comparator yields the token present indicium using a comparison with a threshold reference. The comparator may contain hysteresis and also require a multiplicity of positive logic inputs prerequisite to generation of a logical token present positive indication.

While particular elements, embodiments and applications of the present invention have been shown and described, it is understood that the invention is not limited thereto since modifications may be made by those skilled in the art, particularly in light of the foregoing teaching. It is therefore contemplated by the appended claims to cover such modifications and incorporate those features that come within the spirit and scope of the invention.

What is claimed is:

1. An identification token reading system comprising:

an identification token reader configured to read a token when energized; and an object presence sensor including a radiation emitter configured to emit a first radiation and define a field of view the radiation emitter generating a synchronization signal;

a radiation receiver configured to receive a second radiation reflected from an object positioned within the field of view, the receiver generating a first signal;

a band-pass filter coupled to the receiver and operable to pass a portion of the first signal having a signal level, the synchronization signal operable to coordinate the timing of the band-pass filter and the radiation emitter; and a comparator configured to receive the portion of the first signal and generate a second signal when the signal level increases above a first predetermined level and, to generate a third signal when the signal level falls below a second predetermined level that is lower than the first predetermined level and is greater than zero, the identification token reader being energized in response to receipt of the second signal and de-energized in response to receipt of the third signal.

2. The identification token reading system of claim 1 wherein the third signal is a negative token present indication, and wherein the object presence sensor switches power to deenergize the identification token reader upon the negative token present indication.

3. The identification token reading system of claim 2 wherein the object presence sensor generates a negative token present indicium upon withdrawal of the object from the field of view.

4. The identification token reading system of claim 1 wherein the object presence sensor deenergizes the identification token reader if no reader data has been received within a predetermined elapsed time after the identification token reader has been energized.

5. The identification token reading system of claim 1 further comprising at least one of a battery and a self-contained power supply.

6. The identification token reading system of claim 1 further comprises a control electronics sub-circuit containing a programmable logic unit or microprocessor.

7. The identification token reading system of claim 1 wherein the object presence sensor incorporates an amplifier with a switched offset null.

8. The identification token reading system of claim 7 wherein the object presence sensor zeroes the amplifier offset null immediately preceding the radiation source pulse.

9. The identification token reading system of claim 1 wherein the object presence sensor incorporates a clock and synchronization control.

10. The identification token reading system of claim 1 containing hysteresis wherein the object presence sensor positively indicates token present status within a distance and negatively indicates token present status away from the distance.

11. A locking mechanism comprising:

an emitter configured to selectively emit a first radiation;

an optical detector configured to detect the presence of an object within a field of view at least partially based on reflected radiation from the emitter and to generate a first signal having a signal strength that is related to the proximity of the object to the detector;

an amplifier with a switched offset null and positioned to receive the first signal and output an amplified first signal having an amplified signal strength;

a sensor configured to receive the first signal and to generate one of a second signal when the amplified signal strength increases past a first predetermined level and a third signal when the amplified signal strength falls below a second predetermined level, the emitter, the sensor, and the amplifier synchronized such that the amplifier is activated and the amplified first signal is zeroed immediately prior to activating the emitter and emitting a subsequent pulse of the first radiation;

an identification token reader configured to energize in response to the second signal and de-energize in response to the third signal, when energized, the identification token reader configured to read data from the object;

a timer configured to de-energize the identification token reader in response to the passage of a predetermined amount of time and the failure to read data from the object; and a lock mechanism configured to disengage a lock in response to the read data from the object.

12. The locking mechanism of claim 11 where the third signal is a negative indication of token present, and wherein the token reader is de-energized in response to the negative indication of token present.

13. The locking mechanism of claim 12 where the sensor generates a negative token present indicium upon withdrawal of the object from the sensor's field of view.

14. The locking mechanism of claim 11, further comprising a battery or self contained power supply.

15. The locking mechanism of claim 11, further comprising a control electronics sub-circuit containing a programmable logic unit or microprocessor.

16. The locking mechanism of claim 11, further comprising a synchronized filter.

17. The locking mechanism of claim 11, further comprising a clock and synchronization control.

18. The locking mechanism of claim 11 containing hysteresis where the object presence sensor positively indicates token present status at a closer distance than the sensor negatively indicates token present status.

19. The locking mechanism of claim 11, wherein the first predetermined level is greater than the second predetermined level and the second predetermined level is non-zero.

20. An identification token reading system comprising:

a power supply configured to supply power;

an emitter coupled to the power supply, and configured to receive at least a portion of the power and to selectively emit an emitted signal using the at least a portion of the power and to generate a synchronization signal;

a receiver, having a field of view, and configured to receive a reflected signal when an object is present in the field of view to reflect the emitted signal;

a band-pass filter coupled to the receiver and operable to pass a portion of the reflected signal having a signal level that varies between a first level and a second level when the emitter is emitting a signal, the synchronization signal operable to coordinate the timing of the band-pass filter and the radiation emitter;

a circuit coupled to the receiver and configured to generate a first signal when the signal level rises above a third signal level and to generate a second signal when the signal level falls below a fourth level, the fourth level being below the third level; and a token reader coupled to the circuit and configured to switch to an ON state in response to the first signal and an OFF state in response to the second signal, when in the ON state, the token reader configured to receive power from the power supply to read the object.

21. The identification token reading system of claim 20 wherein the circuit switches power to deenergize the identification token reader upon receipt of the second signal.

22. The identification token reading system of claim 20 wherein the circuit generates the second signal upon withdrawal of the object from the field of view.

23. The identification token reading system of claim 20 wherein the circuit deenergizes the identification token reader if no reader data has been received within an amount of time after the identification token reader has been energized.

* * * * *

UNITED STATES PATENT AND TRADEMARK OFFICE

CERTIFICATE OF CORRECTION

PATENT NO. : 7,639,117 B2
APPLICATION NO. : 11/038967
DATED : December 29, 2009
INVENTOR(S) : James F. Wiemeyer It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 454 days.

Signed and Sealed this

Ninth Day of November, 2010

David J. Kappos
*Director of the United States Patent and Trademark Office*